UNITED STATES PATENT OFFICE.

JOHN J. MOSSOP AND WILLIAM MAGRADY, OF PHILADELPHIA, PENNSYLVANIA, ASSIGNORS OF ONE-FOURTH TO CHARLES DONOVAN, OF NARBERTH, PENNSYLVANIA, AND ONE-FOURTH TO JOSEPH F. DONOVAN, OF PHILADELPHIA, PENNSYLVANIA.

SOLDERING COMPOUND.

No. 799,749.   Specification of Letters Patent.   Patented Sept. 19, 1905.

Application filed March 19, 1904. Serial No. 199,044

*To all whom it may concern:*

Be it known that we, JOHN J. MOSSOP and WILLIAM MAGRADY, citizens of the United States, residing in the city and county of Philadelphia, State of Pennsylvania, have invented a new and Improved Compound for Hard-Soldering or Brazing Cast-Iron, of which the following is a specification.

The object of our invention is to provide a new and improved soldering compound the use of which will so prepare the fractured surfaces of cast-iron as to enable them to be thoroughly united and held together by the application or addition of a suitable solder or braze without weakening the iron in the process. In all methods or processes which we have seen employed for this purpose the effect or tendency has been to weaken the iron on either side of the fracture, and the effect of any undue strain has been to produce a new fracture alongside of and parallel to the old fracture. This fact has led us to seek to produce a chemical combination to be applied to the surfaces to be brazed which will enable the iron to retain its original properties as near as may be, and thereby prevent its being weakened in the process of brazing.

A series of careful tests made on the most approved testing-machines and conducted by experts in testing have demonstrated that the iron surrounding the repaired fracture which has been treated with our compound is strengthened, as in all tests made the new fracture has been at some distance from the old fracture.

To form our soldering compound we use two (2) parts of prussiate of potash dissolved in one (1) part of hydrochloric acid, to which is added one (1) part of ammonium chlorid and four (4) parts of water. The active constituents are cyanid of potassium, hydrochloric acid, and ammonium chlorid in a liquid state. Any other chemical in this solution is regarded as an impurity.

*Method of using.*—The abutting surfaces of the fracture are carefully cleaned and the soldering compound applied to both of them as a paint with a paint-brush. The piece is then held together in perfect alinement and while in this position is heated to a temperature approximating 1,100°. An ordinary flux is now applied to the fracture, and while at this temperature the spelter in a granulated form is applied, sufficient being used to fill the entire space between the fractured surfaces. The article is then allowed to cool gradually.

Having described our compound and explained the results obtained by its use, what we claim, and desire to secure by Letters Patent of the United States, is—

A soldering compound for use in brazing cast-iron, consisting of prussiate of potash, hydrochloric acid, ammonium chlorid and water substantially as set forth.

JOHN J. MOSSOP. [L. S.]
WILLIAM MAGRADY. [L. S.]

Witnesses:
E. J. COLLINS,
J. HOWARD SMITH.